May 9, 1933. J. W. STEVENSON 1,907,456
AUTOMATIC BOX STACK DUMPER
Filed Nov. 23, 1931 2 Sheets-Sheet 1
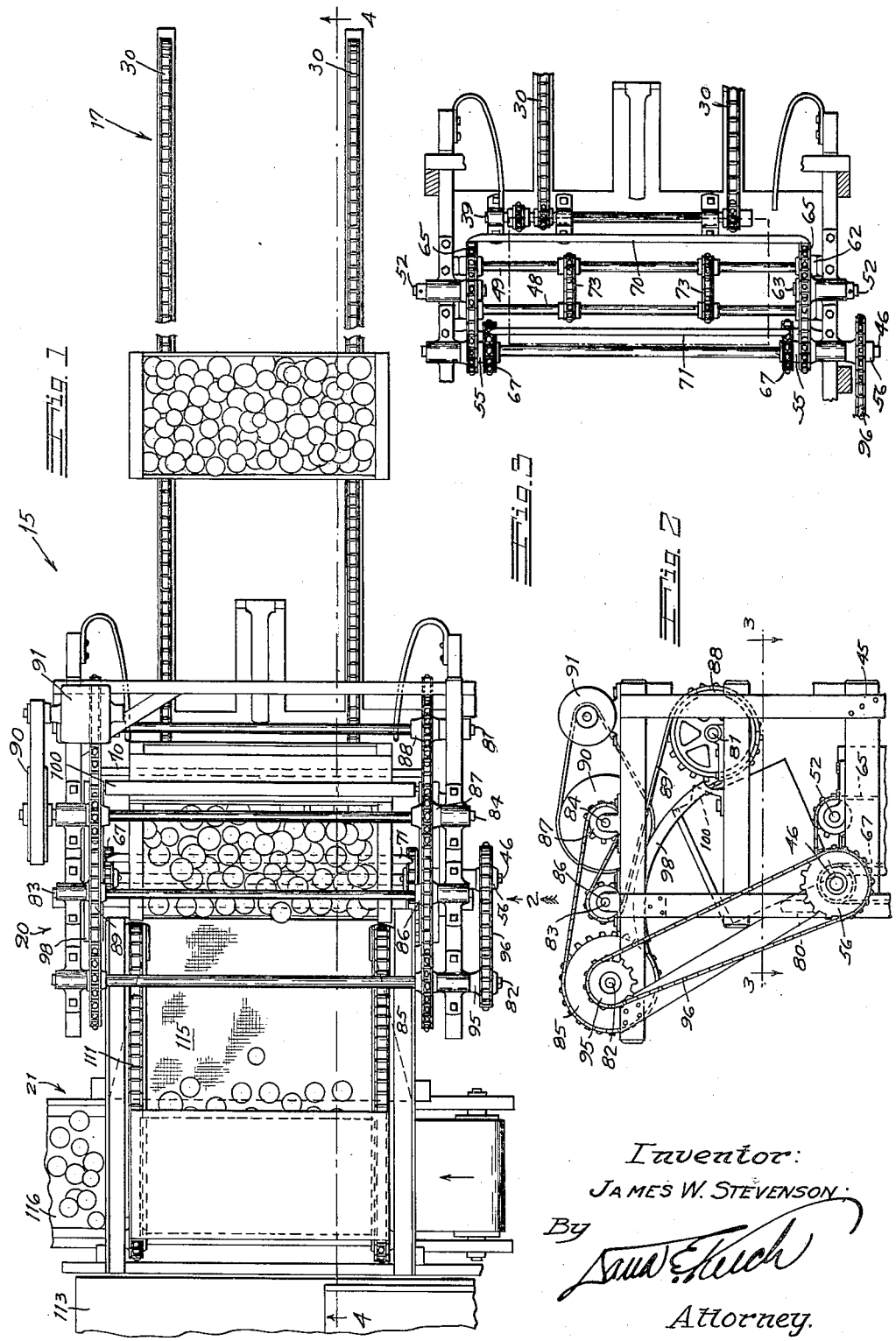
Inventor:
JAMES W. STEVENSON
By
Attorney.

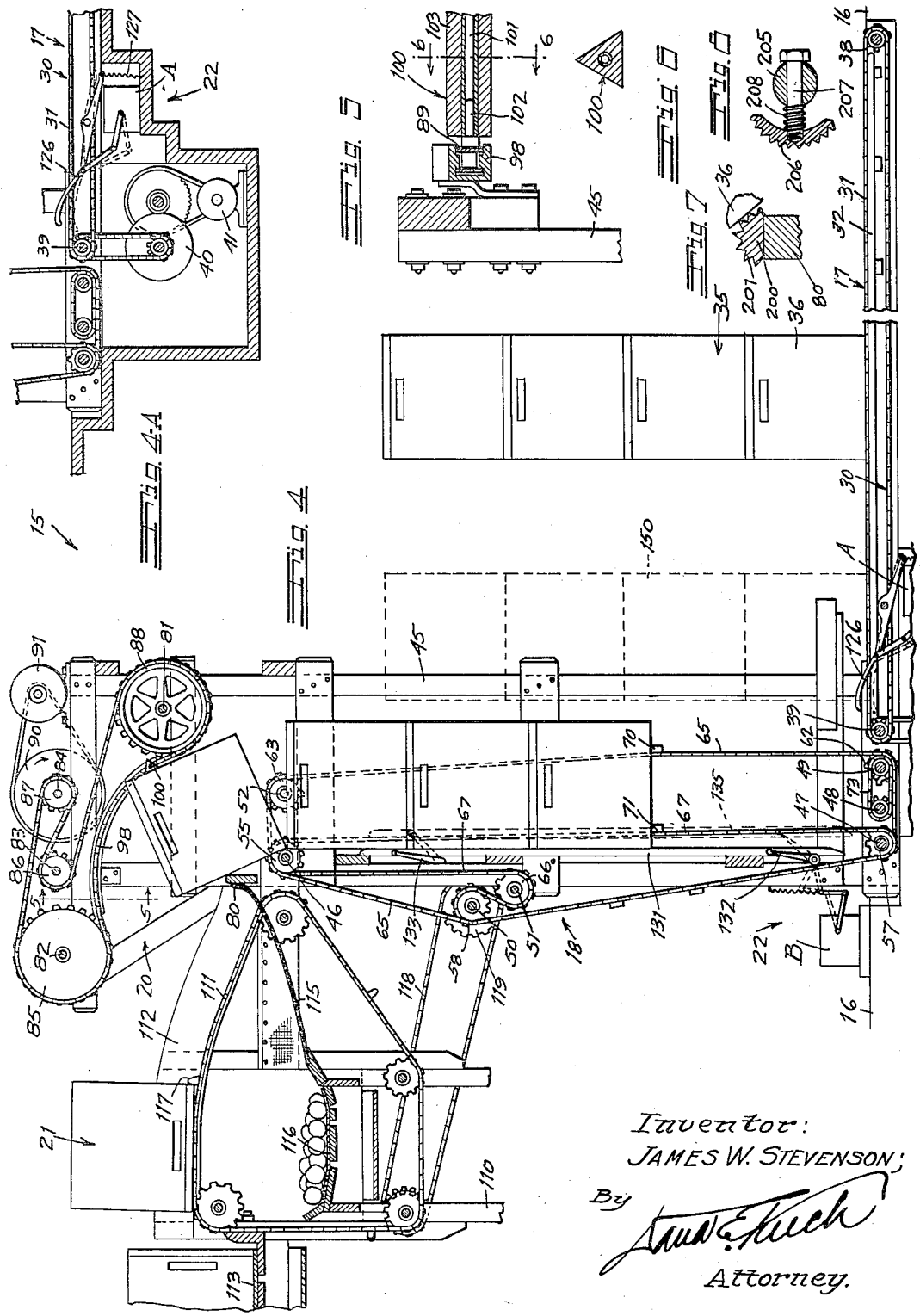

Patented May 9, 1933

1,907,456

UNITED STATES PATENT OFFICE

JAMES W. STEVENSON, OF RIVERSIDE, CALIFORNIA

AUTOMATIC BOX STACK DUMPER

Application filed November 23, 1931. Serial No. 576,692.

My invention relates to receptacle dumping devices and particularly to automatic box dumps.

Although adapted, with slight modification, for use in a variety of industries, the preferred embodiment of my invention hereinafter described is designed particularly for use in the citrus industry for the handling of oranges.

At orange packing houses, oranges are received from the groves in field boxes, and are stored in these boxes with the latter stacked up four to six high until the time comes to prepare the fruit for shipment. The latter process is a continuous one which requires the oranges to be dumped from the field boxes at a relatively uniform speed throughout the day.

Box dumping machines are in general use at present, to which machines, boxes are fed one at a time from a horizontal conveyer. The receiving end of this conveyer extends close to where the boxes are stacked and it is necessary for a man to "break down" these stacks and place the boxes one by one on the conveyer. In doing this work, the men must be very careful not to drag the bottoms of some of the boxes across top fruit in the boxes therebeneath, as this would injure the top fruit causing it to decay prematurely. This work is sufficiently difficult, however, that the men get tired and neglect to take the care necessary to protect the fruit. This causes large losses in the decaying of fruit enroute to markets.

It is accordingly an object of my invention to provide a stack dump which will successively dump the boxes in a stack without these being manually "broken down".

Stacks of boxes are handled by hand trucks and one man can usually truck up these stacks considerably faster than it is desired to dump them. In order to conserve the time of the man delivering such stacks to the stack dumper, I conceived the idea of providing means onto which this man could deliver a number of stacks and which would feed these stacks to the dumper as they are needed.

Many different devices have been provided for dumping boxes to empty the contents therefrom. Each of these dumps include a means to feed a box into a given position, and a dumping means which receives the box in this position and dumps it. The drawback of both of the dumping means used in these box dumpers, is that this means includes arms which have to pass back through the space occupied by the box in receiving position before another box can be moved into this position. This greatly slows up the dump and has other disadvantages.

Other means for dumping boxes have been provided, but they have been unsuccessful owing to the fact that they depended upon sinking teeth into the ends of the box to accomplish the lifting and dumping thereof. The main trouble of this was that after passing through it only a relatively few times the ends of a box would become so chewed up that the box would slip on the dumping means and jam the machinery.

It is accordingly an object of my invention to provide a novel dumping mechanism which neither passes back through the box receiving position for receiving another box nor lifts the box by sinking teeth into the end faces thereof.

The mechanism referred to hereinabove for gripping the box by pressing teeth into its outside end faces presented another difficulty in that they tended to push the end pieces inwardly between the sides and bottom of the box, as the only thing resisting this are the nails by which the sides and bottom are nailed to the ends of the box.

It is a still further object of my invention to provide a mechanism for dumping a box which accomplishes this by gripping the box but which, instead of tending to disassemble the box, has the tendency to hold the box together all the more securely.

This application is a continuation in part of my copending application for U. S. Letters Patent, Ser. No. 453,839, filed May 19, 1930, and reference is had to this copending application for description of certain elements of the invention shown herein which it is not desired to repeat.

The manner in which the above objects are accomplished as well as further objects and advantages, will be made manifest in the following description and the accompanying drawings in which:

Fig. 1 is a plan view of a preferred embodiment of my invention.

Fig. 2 is a fragmentary side elevational view taken in the direction of the arrow 2 of Fig. 1.

Fig. 3 is a fragmentary horizontal sectional view taken on the line 3—3 of Fig. 2.

Figs. 4 and 4A are sectional views taken on the line 4—4 of Fig. 1, Fig. 4A being a fragmentary view complementary to Fig. 4.

Fig. 5 is a fragmentary sectional detail view taken on the line 5—5 of Fig. 4.

Fig. 6 is a cross sectional view taken on the line 6—6 of Fig. 5.

Fig. 7 is a fragmentary cross sectional view of a modified form of fulcrum board of my invention.

Fig. 8 is a diagrammatic cross sectional view of a modified form of dumping bar of my invention.

Referring specifically to the drawings the illustrated embodiment of my invention comprises a box stack dumper 15 which is supported upon a floor 16 and which includes a receiving and stack feeding mechanism 17, a stack elevating mechanism 18, an individual box dumping mechanism 20, a fruit and empty box receiving mechanism 21, and an automatic control means 22 for controlling the mechanisms 17 and 18.

The stack receiving and feed mechanism 17 includes a pair of spaced roller chains 30 mounted in the floor 16 so that upper flights 31 of the chains 30 travel upon rails 32 whereby the upper flights 31 are positioned just above the surface of the floor 16. A stack 35 of filled boxes 36 may be set down upon these upper chain flights so that when these chains are placed in motion, this stack will be conveyed along the floor 16. At their opposite ends, the chains 30 pass over sprockets on shafts 38 and 39 which are suitably journalled in bearings supported on the floor 16. The shaft 39 is connected through a suitable gear and chain reduction drive system 40 to an electric motor 41 as clearly shown in Fig. 4A.

The stack elevating mechanism 18 is mounted upon a frame 45 and includes a drive shaft 46 suitably journalled upon an upper portion of the frame 45, idle shafts 47, 48 and 49 suitably journalled on the lower portion thereof, and intermediate shafts 50 and 51 suitably journalled on a middle portion of said frame. Also suitably journalled on the frame close to and on about the same level as the shaft 46 are stub shafts 52.

Mounted on the shaft 46 is a pair of spaced double sprockets 55 and on one end of this shaft a drive sprocket 56. Mounted on the shafts 47 and 50 are pairs of spaced double sprockets 57 and 58 respectively. The sprockets 55, 57 and 58 are in alignment respectively with each other. Mounted on the shafts 49 and stub shafts 52 are single sprockets 62 and 63 respectively, these single sprockets being in alignment with the outermost wheels of the aforementioned double sprockets 55, 57 and 58 so that the sprockets thus aligned carry a pair of chains 65. Provided on the shaft 51 are a pair of single sprockets 66 which are in vertical alignment with the inner wheels of the aforementioned double sprockets 55, 57 and 58 so that the sprockets thus aligned carry a pair of chains 67. The chains 67 are of the same length as the chains 65. Owing to the chains 67 passing over a shorter course within the frame 45 the unused portion of their length is taken up by the manner in which they pass around the sprockets 58 and 66. Secured between the respective pairs of chains 65 and 67 are cross bars 70 and 71.

Extending around suitable small sprockets provided on the shafts 48 and 49 in alignment with the roller chains 30 of the stack receiving and feeding mechanism 17 is a pair of short chains 73 which are driven by the shaft 49 whenever this is rotated.

The dumping mechanism 20 includes a fulcrum board 80 which is secured upon the frame 45 as shown. Suitably journalled on the frame 45 are shafts 81, 82, 83 and 84 which carry pairs of spaced sprockets 85, 86, 87 and 88, those on each side being in alignment with each other so that these sprockets carry a pair of roller chains 89. The shaft 84 is driven through a pulley 90 by a motor 91. The shaft 82 in turn has a sprocket 95 which is connected through a chain 96 to the sprocket 56 for the purpose of rotating the elevator drive shaft 46. Lower portions of the chains 89 between the sprockets 85 and 88 are guided in arcuate chain guides 98 which are secured to the frame 45 as shown in Fig. 5. The portions of the chains 89 traveling through the guides 98 traverse arcs having the same center as a curved upper surface of the fulcrum board 80. Supported at its opposite ends upon the chains 89 is a box dumping bar 100. This bar may be of any suitable formation but preferably includes a metallic pipe 101, the ends of which receive pins 102 which project from a pair of opposite links in the chains 89, this pipe being surrounded by a covering 103 which is preferably formed of a material having a high coefficient of friction such as rubber. The covering 103 is shown in Fig. 6 as triangular in cross section to prevent its rolling when in engagement with the box 36.

The fruit and empty box receiving mechanism 21 includes a frame 110 upon which are provided suitable means for supporting a pair of box carrying chains 111 as clearly shown in Figs. 1 and 4, there being side boards 112 to retain boxes in place upon the chains 111 and a conveyer belt 113 carrying away boxes discharged from the chains 111. Also supported upon the frame 110 is a fruit receiving chute 115 which is preferably formed of pliable fabric from which fruit is adapted to roll onto a conveyer belt 116 for conveying the fruit to a washer. The chains 111 may have lugs 117 for keeping boxes 36 straight thereon. These chains are driven in synchronism with the elevator 19 and dumper 20 as through a chain 118 which connects to a sprocket 119 provided on the shaft 50.

The receiving and feeding mechanism 17 is for the purpose of receiving and feeding stacks 35 into the elevator 18 so that each of these stacks will be lifted by the cross bars 70 and 71 and elevated so that the boxes in the stack are dumped one by one by the dumping mechanism 21. The coordination of the mechanisms 17 and 18 to accomplish this is effected by the control means 22.

The construction and manner of operation of the control means 22 to coordinate the mechanisms 17 and 18 is clearly shown in my copending application for U. S. Letters Patent filed May 19, 1930, Ser. No. 453,839.

It is desired now to direct particular attention to the manner of operation of the dumping mechanism 20 which is the principal novel feature disclosed in this application over my copending application referred to hereinabove.

As each box 36 is extended upwardly by the elevator 18 so that the upper end of this box extends above the lowermost point of the chains 89, the box dumping bar 100 is approaching this lowermost point on the chains and as it passes through this it is brought into contact with the side of the box 36 so as to tilt this box over to the left as shown in Fig. 4 against the fulcrum board 80. It is to be here noted that the fulcrum board 80 is of relatively small diameter and that it is disposed slightly to one side from above shaft 46 alongside which the boxes are elevated. Thus after each box 36 is brought into contact with the fulcrum board 80 continuous movement of the dumping bar 100 on the continuously moving chains 89 results in this box 36 being swung about the axis of the upper surface of the fulcrum board 80 so as to dump the box 36 thereover. Owing to the lateral displacement of the fulcrum board 80 each box 36, when tilted beyond the position in which it is shown in Fig. 4, leaves its final contact with the box immediately therebeneath with such an upward movement as to entirely prevent interference between these two boxes owing to the swinging movement of the box uppermost.

As each box 36 is swung over the fulcrum board 80 and dumped, it comes to rest with its opposite ends on the empty box removing chains 111 so that all the fruit is dumped downwardly from the box and the box is removed by the mechanism 21. The release of the box from the dumping bar 100 is effected by the change of direction of the chains 89 where these pass around the sprockets 85. The chains 89 are driven at such a rate of speed as to effect dumping of each box 36 but also to insure that the dumping bar 100 will arrive in position to engage and dump the next box 36 exactly at the time that this arrives in the proper position for this. In other words, the chains 89 make one complete revolution about their respective sprockets while the elevator 18 is lifting a stack a distance equal exactly to the height of one box.

While in Fig. 4 I have shown the fulcrum board 80 as having a plain rounded upper edge, it is of course to be understood that as the dumping of the box 36 is effected by gripping this box between the dumping bar and the fulcrum bar 80, this board cannot be so smooth as not to make a proper frictional engagement with the side of the box. Therefore, while proper scoring provided along the upper edge of this board may result in suitable friction with the boxes over a limited period of time, for long wear it may be preferable to shoe the upper edge of the fulcrum board 80 with a metallic shoe 200 having longitudinal serrations 201 formed thereon, as shown in Fig. 7.

It is also to be noted that while I have shown the dumping bar 100 as having a frictional surface formed of rubber, this bar is not of course to be limited to this specific construction and it may be provided with any desired type of frictional surface which is found preferable. In Fig. 8 I have shown a cross section of a modified form of dumping bar 100 identified by the numeral 205, this bar being preferably fixed rigidly to the chain 89 at its opposite ends so as to prevent rotation thereof relative to the chains. The bar 205 has serrated heads 206 which are adapted to frictionally engage with the outer side of the upper box 36 to accomplish the dumping of this. The heads 206 are mounted on bolts 207 which slide in suitable holes in the bar 205 and are yieldably urged against each box being dumped by springs 208. Thus variations in the width of boxes being dumped are compensated for.

What I claim is:

1. In a box dumping mechanism the combination of: means for conveying a series of boxes to place each box in its turn in a dumping positon; a fulcrum member disposed alongside a box in said positon; and dumping means adapted to engage the opposite side of said box, clamp said box against said fulcrum and, by said clamping engagement, lift said box, swing it upward over said fulcrum and dump the contents therefrom, said dumping means including a pair of sprockets disposed opposite outer side faces of a box in said position, chains running around said sprockets, guides for said chains to carry said chains in an arcuate path relative to said fulcrum member, and a dumping bar carried between said chains, said bar being swung in against said box as it travels on said chains adjacent said sprockets to contact the outer side face of said box, and tilt said box against said fulcrum, and then to rock said box up and over said fulcrum member.

2. In a box dumping mechanism the combination of: a dumping fulcrum disposed substantially at the axis of an arcuate dumping path; arcuate track means disposed adjacent the outer limits of said path and substantially at a uniform radius from said axis; and dumping means guided by said arcuate track means and adapted to engage an outer side face of a box positioned at the lower end of said path, clamp said box with its opposite side face against said fulcrum, and, moving along said arcuate track means, swing said box upwardly through said dumping path and over said fulcrum to dump the contents of the box therefrom, said arcuate track means comprising externally and internally disposed arcuate guiding tracks opposed to each other radially in which said dumping means is adapted to be guided by both of said faces.

3. In a box dumping mechanism the combination of: a dumping fulcrum disposed substantially at the axis of an arcuate dumping path; arcuate track means disposed adjacent the outer limits of said path and substantially at a uniform radius from said axis; and dumping means guided by said arcuate track means and adapted to engage an outer side face of a box positioned at the lower end of said path, clamp said box with its opposite side face against said fulcrum, and, moving along said arcuate track means, swing said box upwardly through said dumping path and over said fulcrum to dump the contents of the box therefrom, said arcuate track means comprising externally and internally disposed arcuate guiding tracks opposed to each other radially in which said dumping means is adapted to be guided by both of said faces, there being an arcuate chain path disposed between said faces along which path chains are adapted to operate to actuate said dumping means.

4. In a box dumping mechanism the combination of: means for elevating a stack of boxes along a substantially straight path to bring the topmost box of the stack into a given dumping position; a fulcrum member opposite said position, said member being spaced from said path; and dumping means associated with said elevating means and operated in timely relation therewith, said dumping means including an arcuate guide member adjacent said path and a box engaging member guided by said guide member and adapted to move into said path at a point opposite said dumping position, engage a side of the uppermost box in said stack, tilt said uppermost box on the box therebeneath until the opposite side of the upper box engages said fulcrum, clamp said upper box against said fulcrum, and continue movement in an arcuate path about said fulcrum member to maintain said clamping of said upper box, lift said upper box from the box therebeneath and swing said upper box over said fulcrum to dump the contents therefrom.

5. In a box dumping mechanism the combination of: means for elevating a stack of boxes along a substantially straight path to bring the topmost box of the stack into a given dumping position; a fulcrum member opposite said position, said member being spaced from said path; and dumping means associated with said elevating means and operated in timely relation therewith, said dumping means including a bar suspended between a pair of endless chains mounted on pairs of sprockets above the upper end of said elevator, one pair of sprockets being opposite said dumping position and on the opposite side thereof from said fulcrum member, said bar travelling about said last mentioned pair of sprockets to move into said path at a point opposite said dumping position, engage a side of the uppermost box in said stack, tilt said uppermost box on the box therebeneath until the opposite side of the upper box engages said fulcrum, clamp said upper box against said fulcrum, and continue movement in an arcuate path about said fulcrum member to maintain said clamping of said upper box, lift said upper box from the box therebeneath and swing said upper box over said fulcrum to dump the contents therefrom.

In testimony whereof, I have hereunto set my hand at Riverside, California, this 28th day of October, 1931.

JAMES W. STEVENSON.